United States Patent [19]
Oldman

[11] 3,804,970
[45] Apr. 16, 1974

[54] ELECTRICAL BUS SYSTEM

[76] Inventor: Murray Oldman, 10855 Savona Rd., Los Angeles, Calif. 90024

[22] Filed: Apr. 24, 1972

[21] Appl. No.: 246,772

[52] U.S. Cl............ 174/16 B, 174/72 B, 174/88 B, 174/99 B, 174/133 B
[51] Int. Cl.............................................. H02g 5/06
[58] Field of Search........ 174/15 C, 16 B, 47, 68 B, 174/68 C, 70 R, 70 B, 71 B, 72 B, 88 B, 99 R, 99 B, 99 E, 100, 101, 129 B, 133 B, 149 B; 339/22 R, 22 B; D13/6; 52/738

[56] References Cited
UNITED STATES PATENTS

| | | | |
|---|---|---|---|
| 3,354,261 | 11/1967 | Polgov............................ | 174/133 B |
| 2,310,919 | 2/1943 | Adam................................. | 174/99 B |
| 2,320,093 | 5/1943 | Moore................................ | 174/16 B |
| 2,453,224 | 11/1948 | Hill et al..................... | 174/71 B UX |
| 2,767,241 | 10/1956 | Zuch.................................. | 174/99 B |
| 2,878,300 | 3/1959 | Rugg................................. | 174/15 C |
| 2,904,621 | 9/1959 | Grier............................. | 174/99 B X |
| 2,964,586 | 12/1960 | Sillman............................. | 174/99 B |
| 3,072,736 | 1/1963 | Wallace............................. | 174/99 B |
| 3,110,754 | 11/1963 | Witort et al..................... | 174/70 R |
| 3,210,716 | 10/1965 | Meacham......................... | 174/70 B X |
| 3,484,538 | 12/1969 | Nicholls........................... | 174/88 B |

FOREIGN PATENTS OR APPLICATIONS 1,440,838  3/1969  Germany........................ 174/133 B

OTHER PUBLICATIONS

Catalogue: "Generaline Stock Dies and Standard Warehouse Items for Aluminum Extruded Shapes, Rod and Bars," published by General Extrusions, Inc., Youngstown Ohio, page 21.

Pamphlet: "This is the Story of Silent Gliss, the Silent Drapery Track," published by Silent Gliss, Inc., Freeport, Illinois, page 8.

*Primary Examiner*—Laramie E. Askin
*Attorney, Agent, or Firm*—Spensley, Horn & Lubitz

[57] ABSTRACT

An Electrical Bus System utilizing insulated conductors which may be readily assembled as desired from standard components to achieve an efficient, low cost installation. The conductors, generally hollow members, are joined by couplings so that any section of conductor may be removed as desired. Straight sections as well as elbows and the like are provided to result in a conductor assembly with a substantially unrestricted passage therethrough so that cool air may be circulated through the conductor. The conductors are assembled into a protective housing and retained therein by molded insulator blocks which are molded with screw sockets therein so as to be retainable in the assembly by self-threading screws. The conductors are provided with an insulating jacket thereon which may be readily locally cut away and then a hole drilled and tapped in the conductor to provide an attachment for a power tap.

7 Claims, 15 Drawing Figures

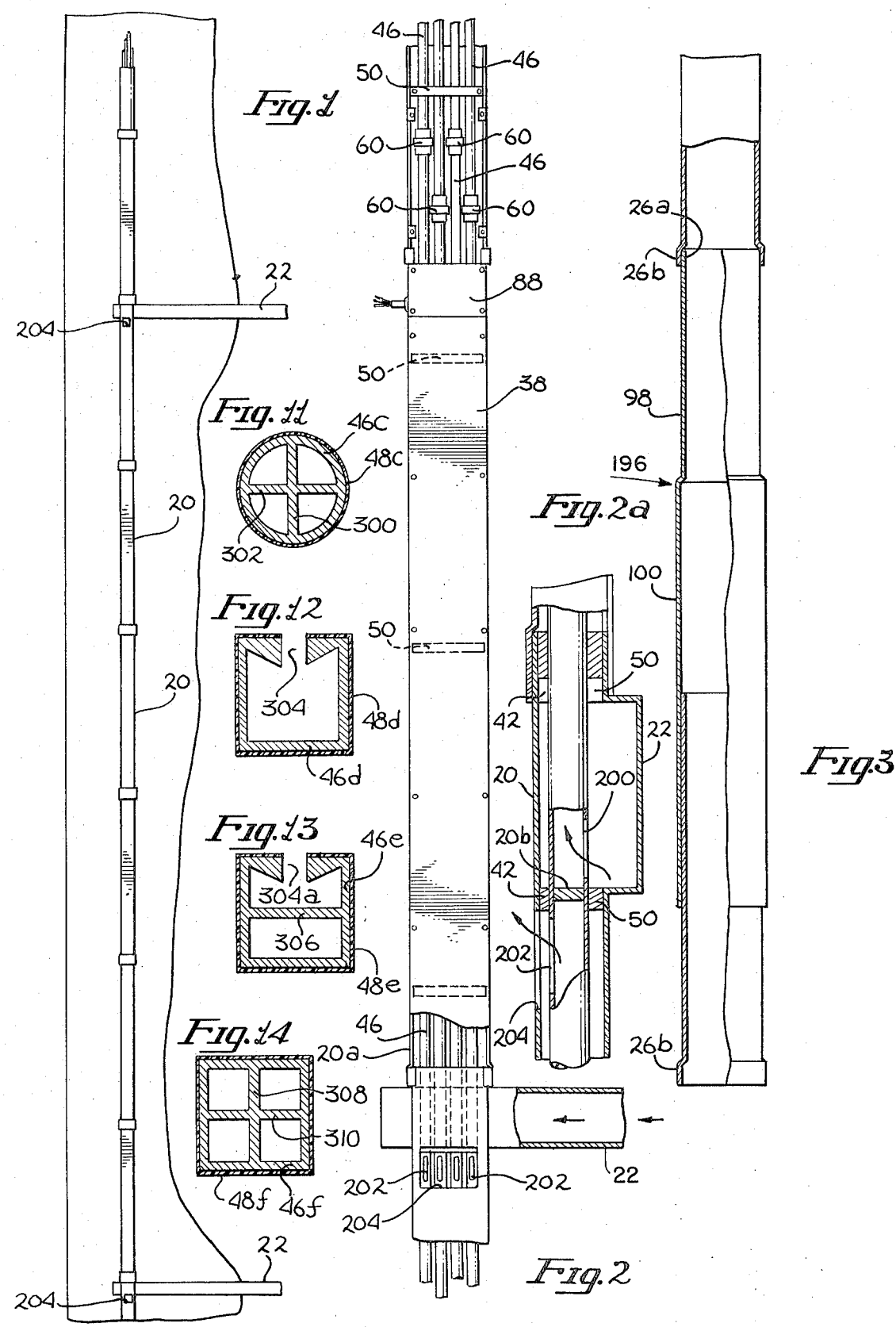

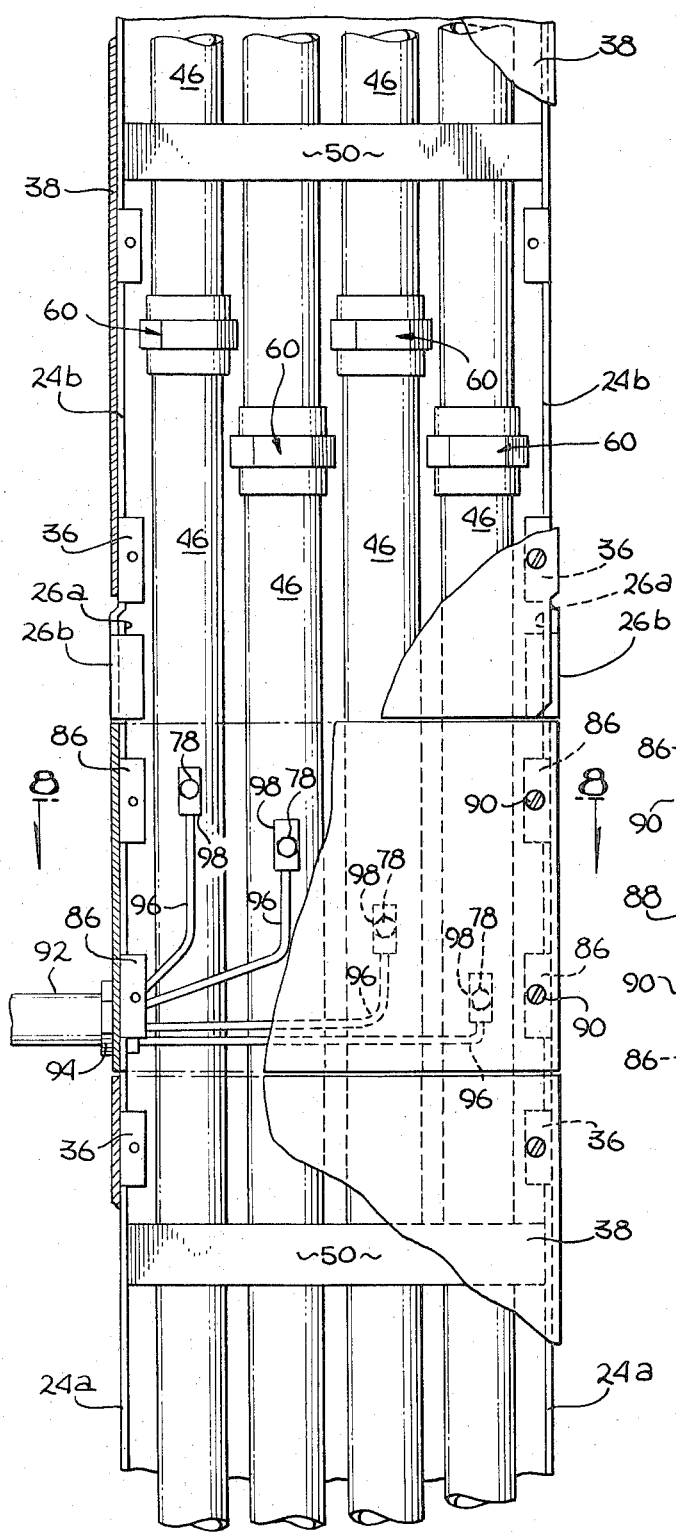
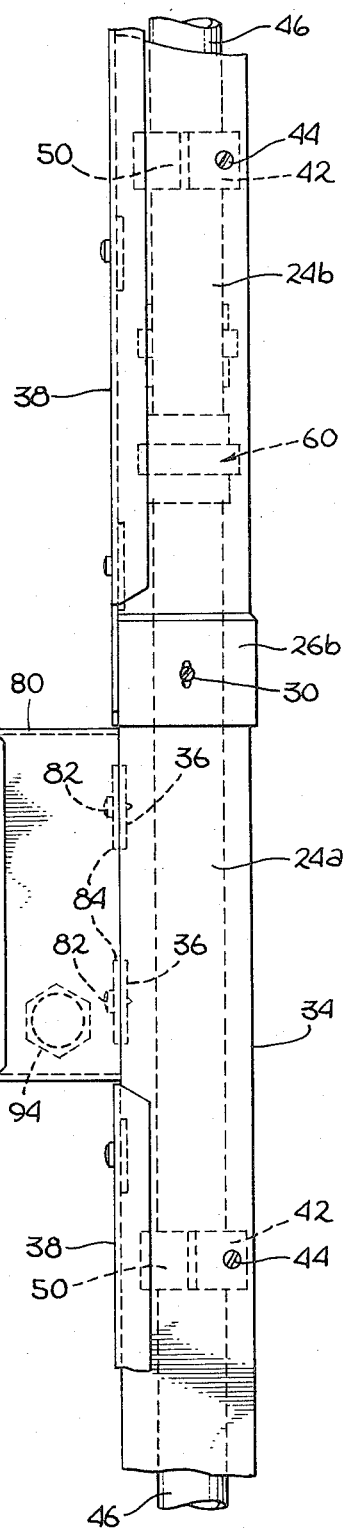
Fig. 4
Fig. 5

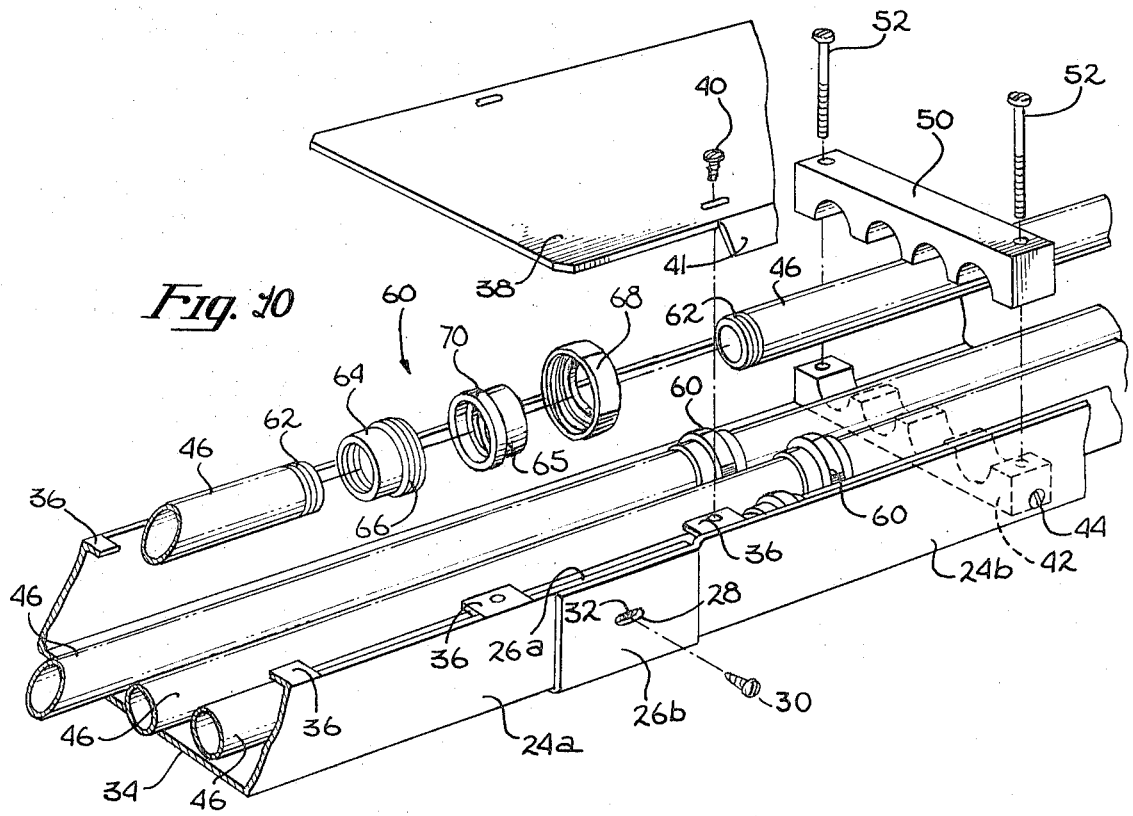

ELECTRICAL BUS SYSTEM

BACKGROUND OF THE INVENTION

1. Field of the Invention

The present invention relates to the field of bus systems, particularly as used for the distribution of electrical power in large buildings.

2. Prior Art

In large buildings such as office buildings and the like, electrical power must be distributed throughout the building. Typically this is accomplished through the use of a system of large conductors, generally referred to as a bus system, whereby power is made available at at least one location at each floor of the building. Attached to the conductors at various points along the length are taps which provide the contacts for taking power from the bus line, such as by way of example at each floor of the building. Thus typically one or more main bus systems are used, with smaller systems being connected thereto for the distribution of power to the multitude of outlets and electrical devices within the building.

Various types of bus systems are known in the prior art. These systems include systems with uninsulated conductors (though covered with a protective housing), insulated conductors, hollow conductor systems with quick connect means between lengths of conductor, and systems adapted for both convection cooling and forced air cooling. However, of all the various systems known in prior art, the systems by far the most commonly used are systems wherein fixed lengths of the bus systems are fabricated at a factory in accordance with the predetermined measurements for the resulting assembly. The various sections are then delivered to the construction site and mounted and connected together to result in the final system.

While the above described system performs satisfactorily, it has certain disadvantages which often create problems and expense. Specifically, the sections of the system must be manufactured typically months before they are installed, and must be manufactured in accordance with precise measurements or known dimensions for the systems so as to be assemblable at the desired time to fit within the physical requirements of the building. If an error is made, either in the determination of a required dimension or in the manufacture of the system, installation delays will occur while new sections meeting the requirements are fabricated. Similarly, if an overload should occur during use so as to burn out or otherwise render inoperative one or more sections of the bus system, a new section may have to be fabricated to order before the bus system may be repaired.

Thus, it may be seen that there is a need for a bus system which is inexpensive to fabricate, simple to install and which may be assembled on installation in essentially any desired length etc., so as to result in a completed bus system which does not require the special manufacture of any components or sections for a particular installation.

BRIEF SUMMARY OF THE INVENTION

An Electrical Bus System utilizing insulated conductors which may be readily assembled as desired from standard components to achieve an efficient, low cost installation. The conductors, generally hollow members, are joined by couplings so that any section of conductor may be removed as desired. Straight sections as well as elbows and the like are provided to result in a conductor assembly with a substantially unrestricted passage therethrough so that cool air may be circulated through the conductor. The conductors are assembled into a protective housing and retained therein by molded insulator blocks which are molded with screw sockets therein so as to be retainable in the assembly by self-threaded screws. The conductors are provided with an insulating jacket thereon which may be readily locally cut away and then a hole drilled and tapped in the conductor to provide an attachment for a power tap.

Special enclosure sections are provided so as to provide a telescoping capability to allow the assembly of standard enclosure sections at the construction site to achieve substantially any desired bus system length. Standard tap boxes and the like are provided so that electrical taps on the bus system may be provided at substantially any location and may readily be added if desired after full assembly of the bus system by only moderate local disassembly of the system. Furthermore, the conductors in the preferred embodiment are joined in such a manner as to be removable in sections without removal of the equivalent section of enclosure so as to be alterable or replaceable as desired in the event replacement is required after installation.

BRIEF DESCRIPTION OF THE DRAWINGS

FIG. 1 is a view illustrating a typical section of the bus system fabricated in accordance with the present invention.

FIG. 2 is a view of a section of the bus system of FIG. 1 illustrating certain of the details thereof.

FIG. 2a is a cross-section of the cooling air duct 22, a conductor, and the surrounding enclosure illustrating the manner in which cool air is delivered to the conductors and is expanded therefrom.

FIG. 3 is a view illustrating the telescoping feature of certain sections of the enclosure for the bus system of the present invention.

FIG. 4 is a top view of a section of the bus system of the present invention, with cover removed, illustrating the manner in which power taps may be attached to the bus system of the present invention.

FIG. 5 is a side view of the section of bus system shown in FIG. 4.

FIG. 6 is a typical cross-section of the bus system of the present invention.

FIG. 7 is a portion of a cross-section of an alternate embodiment of the present invention.

FIG. 8 is a cross-section of the bus system of the present invention taken along line 8—8 of FIG. 4.

FIG. 9 is a top view of an alternate embodiment coupling for joining adjacently disposed ends of the conductors.

FIG. 10 is an exploded view, in perspective, of the section of the bus system of the present invention.

FIG. 11 is a cross-sectional area of an alternate embodiment conductor.

FIG. 12 is a cross-sectional area of an alternate embodiment conductor.

FIG. 13 is a cross-sectional area of an alternate embodiment conductor.

FIG. 14 is a cross-sectional area of an alternate embodiment conductor.

DETAILED DESCRIPTION OF THE INVENTION

First referring to FIG. 1, a view of a substantial section of the assembled bus system may be seen. The assembled system is characterized by a plurality of sections 20 of protective case, disposed and joined end to end so as to result in a system of the desired length. At various lengths along the length of the bus system there may be provided ducts 22 having a blower attached thereto, not shown, to force air through the hollow conductors in a manner which will be subsequently more fully described.

Now referring to FIG. 10, a perspective exploded view of a section of the bus system of the present invention may be seen. The housing within which the conductors are assembled is itself assembled from a plurality of U-shaped sections 24 and covers 38 which attach to the sections. One end 26a of the U-shaped sections such as section 24a is simply cut off at the desired length, which, for a section of an ordinary run, are 10 feet in length in the preferred embodiment. The other end of the U-shaped sections, for instance, end 26b of section 24b is flared outward to as to receive the end 26a of section 24a, thereby providing a means for joining the U-shaped sections and preventing the passage of foreign matter into the protective housing. The flared end 26b has an elongated slot 28 to receive a self-threading sheet metal screw 30 passing through the slot and into a hole 32 in the end 26a of section 24a. Thus, by means of one or more screws on each side of the housing, the sections of the U-shaped housing may be retained together. Similarly, each of the U-shaped housings is provided with a plurality of punched holes in the bottom 34 thereof so that it may be screwed, bolted or otherwise fastened to the surface which is to retain the bus system.

The top of each U-shaped section has a plurality of inward protruding members 36, each of which has a hole punched therethrough, and together defining a top surface plane for receiving a protective cover 38 fastenable to the U-shaped members by self-threading sheet metal screws 40. Like the U-shaped channels, one end of the covers (not shown) is adapted to slide over the end of the adjacent cover so as to provide uninterrupted protection of the conductors therebelow throughout the length of the bus system. The covers 38 are provided with downward projecting edges 41 which both serve as reinforcement for the covers and as further assurance of the inability of foreign matter, screw drivers and the like to become inserted under the cover.

It will be noted that in the embodiment shown in FIG. 10, that end 26b is flared both on the sides thereof and on the bottom thereof, thus providing full enclosure not only at the sides of the enclosure but also on the bottom surface thereof. This will tend to space each of the U-shaped sections slightly outward from the surface on which they are mounted. As an alternate of the above, the flared end 26b may comprise two side sections extending beyond the termination of the bottom so as to join the sides of the next section, thereby avoiding an overlap of the bottom portion of the U-shaped section but still providing adequate enclosure since the bottom normally will be disposed flat against a mounting surface.

Now referring to both FIGS. 6 and 10, details of the internal assembly of the bus system of the present invention may be seen. For purposes of illustration, FIG. 10 shows a portion of the bus system lying with the cover directed upward, whereas FIG. 6 is a typical cross-section of a section of the bus system either taken vertically through a bus system attached to a ceiling, or taken horizontally through a bus system attached to a wall. The U-shaped section 24 has a plurality of support blocks 42, each attached to the U-shaped channel 24 by a pair of self-threading screws 44. The conductors 46, having a layer of insulation 48 thereon, are retained in position by the clampling of a second block 50 to block 42 by a pair of self-threading screws 52.

In the preferred embodiment, the conductors are extruded aluminum tubular members, preferably fabricated from conductor alloy ECH–19 having a 62 percent conductivity. The conductors are insulated by means of a pressure-immersion-electronic process that will deposit a heat resistant thermoplastic vinyl material to a thickness of 40 mils on the entire exterior. Also, in the preferred embodiment, conductors with 2, 3, 4 and 5 inch outer diameters are used with appropriately matching enclosure components and with the inner diameter of the conductors being variable to provide a broad range of current carrying capacity for the system. Thus, it may be seen that standard blocks 42 and 50, as well as a standard housing may be used independent of the current carrying capacity requirements of the system. Similarly, it is to be noted that blocks 42 and 50, which may be phenolic or any of the other well known injection molding materials, are identical except for the holes for receiving a self-threading screw for purposes of assembly. Thus, by using a simple two-piece mold and providing for simple mold inserts to define the holes, a single mold may be used to produce either blocks 42 or blocks 50 in large guantities. (In the preferred embodiment, the base 34 of the U-shaped channels is provided with a plurality of holes 54 spaced longitudinally from the holes for receiving screws 44 to support the blocks 42, so as to receive a mounting means such as screws 56 for mounting the enclosure to the building).

Sections of the conductors 46 can be joined by any of a number of means. In the preferred embodiment, the various sections are joined by means of a coupling, generally indicated by the numeral 60 in FIG. 10. At each end of the conductors 46, a portion of the outer insulation is cut away and the conductors are provided with a threaded area 62. Coupling 60 is very similar in construction to couplings commonly used in plumbing systems, but preferably fabricated of aluminum or other suitable electrical conductor material and the coupling is comprised of first and second internally threaded sections 64 and 65, one of which has an external thread 66 for mating with the internal thread in a coupling member 68, which also engages the flange 70 on the other member 65 to encourage the two members 64 and 65 into firm abuttment. Further, the abutting surfaces are substantially flat surfaces so that any section of conductor may be removed, should removal be desired, such as by way of example, for replacement of burned sections of conductor as a result of an overload on the system. The couplings 60 are preferably staggered in location, as may be seen, by way of example, in FIGS. 2, 4, 5 and 10 so as to allow closer spacing of the conductors while still maintaining room within which to manipulate a device for tightening the couplers.

An alternate coupling is shown in FIG. 9. This coupling means comprises a split-clamp 72 having upward projecting members 74 through which two or more bolts 76 may be caused to tighten the clamp against adjacently disposed uninsulated ends of the conductors 46a. This type of clamp has the advantage that threading of the conductors is not required, and manipulation of a tightening device for tightening the bolts is easily accomplished even with close spacing of the conductors. However, if a cooling medium is to be passed to the hollow conductors, care must be taken in the design and/or assembly of the parts to assure negligible leakage at the coupling.

An alternate form of conductor is shown in the embodiment of FIG. 7. In this figure, a square conductor, also with an insulation coating 48b, is provided, with suitable changes in the support blocks to provide the required support and spacing of the alternate embodiment. The use of the square conductor provides better space utilization though it does require a coupling means other than the coupler 60 shown in FIG. 10, such as by way of example, an alternate form of the coupling shown in FIG. 9. Further alternate forms for the conductor are shown in FIGS. 11 through 14. FIGS. 11 and 14 show conductors 46c and 46f having generally the same outer configuration, including the layers of insulation 48c and 48f, as the conductors in FIGS. 6 and 7 respectively. However, each has a pair of substantially orthogonal internal supporting ribs, such as ribs 300 and 302 in FIG. 11 and ribs 308 and 310 in FIG. 14, which provide substantial support to the outer relatively thin shell of the conductor. Thus, in overload conditions, where the conductor temperature may rise so as to soften and weaken the conductor material, and the magnetic forces between adjacent conductors are very high, the supporting ribs tend to prevent the collapse of the thin shell conductors so as to maintain as high a conductor stiffness as possible to resist the magnetic forces on the conductors. Thus, conductor sag and movement under magnetic forces during overload conditions is minimized by the supporting webs without a substantial detriment to conductor weight and cooling fluid circulation therein. The conductor of FIG. 12, that is conductor 46d having a layer of insulation 48d thereon, has a continuous longitudinal slot 304 so as to be capable of receiving a clamp for a power tap at any position along its length. While this conductor form is not an enclosed form and therefore cooling fluid may not be circulated therethrough, an alternate thereof is shown in FIG. 13 wherein a conductor 46e with a layer of insulation 48e substantially the same in cross-section as that of the conductor of FIG. 12, has the further provision of a supporting web 306 which both defines a passage thereunder through which a cooling fluid may be circulated and which supports the adjacent walls of the conductor so as to achieve the heretofore described objects of the supporting webs. In this regard, it is to be noted that the conductors will be placed in a side by side relationship, with the slots 304a all facing the same direction, so that the supporting webs 306 are substantially coplanar thereby providing the greatest support in opposition to magnetic forces tending to cause the conductors to move into closer or further separation. All of these various embodiments, of course, may be formed by conventional extrusion techniques to maintain a low conductor cost.

Now referring to FIGS. 4, 5 and 8, the means for providing power taps in the preferred embodiment of the present invention may be seen. FIG. 4 is a top view of the bus system with the cover partially cut away. Connections may be made to the assembled bus system at any point along its length in the following manner. First, the cover may be removed (if the system has been fully assembled) and the conductors drilled and tapped so as to receive a bolt 78. Next, the insulation in the area surrounding the tapped hole is cut away so as to expose the surrounding surface of the conductor. A convenient means for accomplishing this task is to provide a cutter of proper dimensions which will locate with respect to the tapped hole so as to quickly and accurately cut away the insulation in the desired area. Thereafter, a tap box 80 may be connected to U-shaped member 24 by means of self-threading screws 82 passing through oppositely disposed tabs 84 cooperatively disposed with respect to the tabs 36 to which a cover 38 is normally attached. The tap box 80, generally of open rectangular form, has additional tabs 86 at the top thereof for attachment of a cover 88 through self-threading screws 90. The tap box 80 also has one or more knock-out plugs of the conventional type on the sides thereof to receive a conduit 92 which is attached to the tap box by means of jam nuts 94. Conduit 92 typically will be bent close to the point of departure from tap box 80 so as to curve downward to lie substantially flat against the surface supporting the bus system, so that it, in turn, may be supported throughout its length to additional junction boxes and like of conventional design.

Distribution wires 96 are provided through conduit 92, and connecting plugs 98 are attached to the ends thereof. These plugs should generally conform to the curvature of the conductors 46, which in the preferred embodiment have a standardized outer diameter of 2 inches, and preferably have a curvature slightly in excess of that of the conductors, as well as being curved slightly in a direction parallel to the axis of the conductors so as to normally rest on the outer extremities (that is, the corners) of the plugs until drawn down flat against the surface of the conductor by the screws 78, thereby resulting in some elastic encouragement of the plugs 98 against the surface of the conductors when the bolts 78 are tightened. Thus, it may be seen that the tap box 80 can be placed substantially anywhere in the bus system without requiring special lengths of bus in any manner whatsoever, and further, may be subsequently added to a totally assembled system by merely removing a section of cover, drilling, tapping, etc., the conductors, mounting the tap box and completing the assembly, replacing the original cover with a shorter, but standard length of new cover.

The conductors 46 may readily be cut to the desired length, if full length conductors (10 foot in the preferred embodiment) are not required or will not fit at a particular place in the assembly, and if the coupling 60 is used, may readily be threaded by a power threading tool at the construction site for quick assembly in much the same manner as a plumbing system is assembled from galvinized pipe. Thus conductors of any length may be readily provided at the construction site using standard length conductors to start with. The enclosure, however, is not so easily adapted to different lengths and, therefore, standard sections are provided which may be assembled to provide the desired length variable over substantially any reasonable length. By way of example, the basic sections (also 10 feet in length in the preferred embodiment) are assembled together in a manner illustrated in FIG. 10 and also indicated by the regions 26a and 26b in FIG. 3. In addition, telescoping sections are provided in various lengths, such as the section generally indicated by the numeral 196 in FIG. 3. This section is characterized by one portion 98 of the usual dimension, and a second elongated portion 100 flared outwardly so as to provide a telescoping capability with an adjacent standard section. Thus, section 196, together with a standard section, may be telescoped to provide any reasonable range of desired length. The sides of section 196 in the flared sections are preferably provided with a series of elongated slots, each of which may be similar to slots 28 shown in FIG. 10, with a narrow web between each slot for rigidifying purposes. Preferably, the web between each slot should be equal to or less than the length of slot 28 so that the standard length section may be shifted by as much as the length of slot 28 to assure that the screw hole 32 adjacent the row of slots in section 196 is not covered by one of the rigidifying webs. Thus, it may be seen that with a single telescoping section, a continuous selection of possible lengths over a reasonable range may be achieved and, by providing a selection of three such telescoping sections, in selected lengths, enclosure sections ranging from a few inches long up to 10 feet long may readily be assembled.

Corners, angles and the like have not been described in detail herein, but are assemblable from standard components using appropriately fabricated enclosure sections and angle fittings as commonly used in plumbing systems. Special support blocks are not required since proper positioning of the blocks 42 and 50 in the special enclosure sections will achieve the desired result.

There has been described herein a bus system which utilizes hollow conductors for maximum use of the conductor material, considering the skin effect, which may be readily assembled from standard components at the construction site, and further which may be altered by adding additional taps, removing taps or replacing or altering a portion thereof without the factory fabrication of special sections or the unreasonable disassembly of more than the portion of the assembly sought to be altered. In addition, to further make utilization of the conductivity of the conductor material so as to reduce the amount of material required in a given capacity bus system, the conductors should be kept as cool as reasonably possible. In this regard, it should be noted that aluminum has a temperature coefficient of resistivity of approximately 0.22 percent per degree F, so that the power loss for a given current will be reduced by approximately 5 percent for each 25°F reduction in operating temperature. Since an uncooled system may operate as high as 150° to 180°F, a very substantial reduction in the amount of conductor required for a given current capacity may be achieved if the rise above normal room temperature can be minimized. In the preferred embodiment, as previously described, the conductors are hollow conductors and the means of joining sections of conductors are of a type which do not obstruct an inner diameter of the conductors at the point of junction. Therefore, a continuous passage for the flow of a cooling fluid is provided, and further, provided a coupling system such as coupling 60 shown in FIG. 10 is used, a substantially leak-proof unobstructed cooling fluid conduit is provided. Thus, either cooling air or a cooling liquid may be easily circulated through the conductors to cool the conductors and reduce the resistance of the conductor material. Since most modern buildings are air conditioned, and further, air conditioned air of a temperature as low as 45°F is commonly delivered to a supply plenum on each floor of a building, such air conditioned air may be circulated through sections of the assembled bus system to maintain the bus conductors in a temperature range of approximately 60° to 80°F. Thus, in FIG. 2, a conduit 22, through which air conditioned air may be forced by a blower of conventional design (not shown), is provided at various points along the bus line. Conduit 22 is cooperatively disposed and attached to a special section of enclosure 20 so as to deliver cool air to one side of the conductors 46 therein. Cool air so delivered passes through a slot 200 in each of the conductors, as may be better seen in FIG. 2a, so as to be directed along the length of the conductor. Similarly, slots 202 are disposed adjacent an opening 204 in the enclosure cover so as to provide discharge of cooling air injected into the conductors at another location. Each conductor is provided with a closure member 206 which separates the air about to be ejected from the cool air being injected, with blocks 42 and 50 further assuring the passage of the air through the conductors as desired rather than between the conductors and the enclosure. (The blocks 42 and 50 are quite effective in sealing off the enclosure so as to provide not only an obstruction to the flow of cooling air between the enclosure and the conductors as hereabove described, but also so as to provide a fire break to prevent the spread of fire along the bus system, between floors of a building, etc.).

Thus, it may be seen that cooling air, preferably from the building air conditioning system, may be readily injected into the conductors at a number of points and expelled generally adjacent the next area of cooling air insertion, so as to provide maximum cooling and utilization of the conductor material in the bus system. The slots 200 and 202 preferably are relatively long and narrow slots so as to result in minimum reduction in the conductor cross-sectional area at that point. Of course, the sections used in that region may also be provided with a thicker wall so as to make up for the potential reduction in cross-section due to the slot. Furthermore, cooling fluids other than air may readily be circulated through the bus system by making minor modifications in the means for delivering the cooling fluid to the conductors and for recovering the cooling fluid from the conductors. Thus, while the present invention has been particularly shown and described generally with reference to a preferred embodiment thereof, it will be understood by those skilled in the art that various changes in form and details may be made therein without departing from the spirit and scope of the invention.

I claim:

1. A bus system comprising; an enclosure, a plurality of conductors, means joining adjacent ends of said conductors, and a plurality of spacer blocks, said enclosure being assembled from a plurality of U-shaped elongate sections having a generally flat base for mounting to a surface, a pair of substantially parallel sides integral with said base, and a plurality of covers fitting over said U-shaped sections, said U-shaped sections having a plurality of integral, substantially coplanar tabs adjacent the top of said parallel sides receiving a means fastening said covers to said sections, said U-shaped sections and said covers each having first and second ends having means cooperatively mating with the second and first ends, respectively, of adjacent said U-shaped sections and covers, said spacer blocks having first and second members each of a generally rectangular shape and each having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and said U-shaped sections having cooperatively disposed means supporting said first members in spaced apart relation in said U-shaped members with said depressions facing the top of said U-shaped sections and being aligned so as to potentially support each conductor substantially parallel to the base and length of said U-shaped section, said first and second members having means clamping said second member to said first member to retain said conductors therebetween, said conductors having a cylindrical outer surface and said joining means comprises first, second and third coupling members, said first coupling member being internally threaded and threadedly engaging the threaded end of one of said conductors and having a substantially radially outwardly directed flange, said second coupling member being internally threaded and threadedly engaging the threaded end of an adjacent one of said conductors and having a maximum diameter of at least as great a diameter as said flange on said first coupling member, said second coupling member being threaded on the outer periphery thereof, said third coupling member being internally threaded and threadedly mating with said flange on said second coupling member and having a radially inwardly directed flange adjacent one end thereof for engaging said flange on said first coupling member, said conductors having an internal passageway defining a conduit for the passage of a cooling fluid therethrough, and wherein said means joining adjacent ends of said conductors is a means joining adjacent ends of said conductors by attachment to the outer surface thereof in a generally leak proof manner whereby said internal passageways of adjacent conductor sections are in direct communication.

2. A bus system comprising; an enclosure, a plurality of conductors, means joining adjacent ends of said conductors, and a plurality of spacer blocks, said enclosure being assembled from a plurality of U-shaped elongate sections having a generally flat base for mounting to a surface, a pair of substantially parallel sides integral with said base, and a plurality of covers fitting over said U-shaped sections, said U-shaped sections having a plurality of integral, substantially coplanar tabs adjacent the top of said parallel sides receiving a means fastening said covers to said sections, said U-shaped sections and said covers each having first and second ends having means cooperatively mating with the second and first ends, respectively, of adjacent said U-shaped sections and covers, said spacer blocks having first and second members each of a generally rectangular shape and each having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and said U-shaped sections having cooperatively disposed means supporting said first members in spaced apart relation in said U-shaped members with said depressions facing the top of said U-shaped sections and being aligned so as to potentially support each conductor substantially parallel to the base and length of said U-shaped section, said first and second members having means clamping said second member to said first member to retain said conductors therebetween, said conductors being hollow cylindrical metal conductive members with a layer of insulation over the outer surface thereof, each of the two ends of said conductive members extending beyond said layer of insulation and being threaded on the outer surface thereof, said joining means having first, second and third coupling members, said first coupling member being internally threaded and threadedly engaging the threaded end of one of said conductors and having a substantially radially outwardly directed flange, said second coupling member being internally threaded and threadedly engaging the threaded end of an adjacent one of said conductors and having a maximum diameter of at least as great a diameter as said flange on said first coupling member, said second coupling member being threaded on the outer periphery thereof, said third coupling member being internally threaded and threadedly mating with said flange on said second coupling member and having a radially inwardly directed flange adjacent one end thereof for engaging said flange on said first coupling member.

3. A bus system comprising; an enclosure, a plurality of conductors, a blower means, a ventilated section of bus means joining adjacent ends of said conductors, and a plurality of spacer blocks, said enclosure being assembled from a plurality of U-shaped elongate sections having a generally flat base for mounting to a surface, a pair of substantially parallel sides integral with said base, and a plurality of covers fitting over said U-shaped sections, said U-shaped sections having a plurality of integral, substantially coplanar tabs adjacent the top of said parallel sides receiving a means fastening said covers to said sections, said U-shaped sections and said covers each having first and second ends having means cooperatively mating with the second and first ends, respectively, of adjacent said U-shaped sections and covers, said spacer blocks having first and second members each of a generally rectangular shape and each having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and said U-shaped sections having cooperatively disposed means supporting said first members in spaced apart relation in said U-shaped members with said depressions facing the top of said U-shaped sections and being aligned so as to potentially support each conductor substantially parallel to the base and length of said U-shaped section, said first and second members having means clamping said second member to said first member to retain said conductors therebetween, said conductors having an internal passageway defining a conduit for the passage of a cooling fluid therethrough, and wherein said means joining adjacent ends of said conductors is a means joining adjacent ends of said conductors by attachment to the outer surface thereof in a generally leak proof manner whereby said internal passageways of adjacent conductor sections are in direct communication, said ventilated section of bus having a first region in communication with said blower means whereby cool air may be delivered to said conductors, and a second region generally open to the atmosphere, said first and second regions being separated by a first and second member of one of said spacer blocks, said conductors in said ventilated section having openings in said first and second regions for receiving and expelling cooling air respectively, said conductors further having an obstruction in said internal passageway between said first and second regions.

4. A bus system comprising; an enclosure, a plurality of conductors, means joining adjacent ends of said conductors, and a plurality of spacer blocks, said enclosure being assembled from a plurality of U-shaped elongate sections having a generally flat base for mounting to a surface, a pair of substantially parallel sides integral with said base, and a plurality of covers fitting over said U-shaped sections, said U-shaped sections having a a plurality of integral, substantially coplanar tabs adjacent the top of said parallel sides receiving a means fastening said covers to said sections, said U-shaped sections and said covers each having first and second ends having means cooperatively mating with the second and first ends, respectively, of adjacent said U-shaped sections and covers, said spacer blocks having first and second members each of a generally rectangular shape and each having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and said U-shaped sections having cooperatively disposed means supporting said first members in spaced apart relation in said U-shaped members with said depressions facing the top of said U-shaped sections and being aligned so as to potentially support each conductor substantially parallel to the base and length of said U-shaped section, said first and second members having means clamping said second member to said first member to retain said conductors therebetween, said conductors having a substantially rectangular outer wall with a continuous longitudinal slot therein with at least one web therein which, in cooperation with unslotted walls of said conductors, defines a longitudinal passageway therethrough.

5. A bus system comprising; an enclosure, a plurality of conductors, means joining adjacent ends of said conductors, and a plurality of spacer blocks, said enclosure being assembled from a plurality of U-shaped elongate sections having a generally flat base and a pair of sides integral with said base, and a plurality of generally flat members mating with said U-shaped sections, said U-shaped sections having a plurality of integral, substantially coplanar tabs adjacent the top of said sides receiving a means fastening said generally flat members to said sections, said U-shaped sections having first and second ends having means cooperatively mating with the second and first ends, respectively, of adjacent said U-shaped sections, said spacer blocks having first and second members having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and one of said U-shaped sections and said generally flat members having cooperatively disposed means supporting said first members in spaced apart relation thereon with said depressions facing outward therefrom and being aligned so as to potentially support each conductor substantially parallel to the length thereof, said first and second members having means clamping said second member to said first member to retain said conductors therebetween, said conductors having a cylindrical outer surface and said joining means comprises first, second and third coupling members, said first coupling member being internally threaded and threadedly engaging the threaded end of one of said conductors and having a substantially radially outwardly directed flange, said second coupling member being internally threaded and threadedly engaging the threaded end of an adjacent one of said conductors and having a maximum diameter of at least as great a diameter as said flange on said first coupling member, said second coupling member being threaded on the outer periphery thereof, said third coupling member being internally threaded and threadedly mating with said flange on said second coupling member and having a radially inwardly directed flange adjacent one end thereof for engaging said flange on said first coupling member, said conductors having an internal passageway defining a conduit for the passage of a cooling fluid therethrough, said means joining adjacent ends of said conductors being a means joining adjacent ends of said conductors in a generally leak proof manner whereby said internal passageways of adjacent conductor sections are in direct communication.

6. A bus system comprising; an enclosure, a plurality of conductors, a blower means, a ventilated section of bus means for joining adjacent ends of said conductors, and a plurality of spacer blocks, said enclosure being assembled from a plurality of U-shaped elongate sections having a generally flat base and a pair of sides integral with said base, and a plurality of generally flat members mating with said U-shaped sections, said U-shaped sections having a plurality of integral, substantially coplanar tabs adjacent the top of said sides receiving a means fastening said generally flat members to said sections, said U-shaped sections having first and second ends having means cooperatively mating with the second and first ends, respectively, of adjacent said U-shaped sections, said spacer blocks having first and second members having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and one of said U-shaped sections and said generally flat members having cooperatively disposed means supporting said first members in spaced apart relation thereon with said depressions facing outward therefrom and being aligned so as to potentially support each conductor substantially parallel to the length thereof, said first and second members having means clamping said second member to said first member to retain said conductors therebetween, said conductors having an internal passageway defining a conduit for the passage of a cooling fluid therethrough, said means joining adjacent ends of said conductors being a means joining adjacent ends of said conductors by attachment to the outer surface thereof in a generally leak proof manner whereby said internal passageways of adjacent conductor sections are in direct communication, said ventilated section of bus having a first region in communication with said blower means whereby cool air may be delivered to said conductors, and a second region generally open to the atmosphere, said first and second regions being separated by a first and second member of one of said spacer blocks, said conductors in said ventilated section having openings in said first and second regions for receiving and expelling cooling air respectively, said conductors further having an obstruction in said internal passageway between said first and second regions.

7. A bus system comprising; an enclosure, a plurality of conductors, means joining adjacent ends of said conductors, and a plurality of spacer blocks, said enclosure being assembled from a plurality of U-shaped elongate sections having a generally flat base and a pair of sides integral with said base, and a plurality of generally flat members mating with said U-shaped sections, said U-shaped sections having a plurality of integral, substantially coplanar tabs adjacent the top of said sides receiving a means fastening said generally flat members to said sections, said U-shaped sections having first and second ends having means cooperatively mating with the second and first ends, respectively, of adjacent said U-shaped sections, said spacer blocks having first and second members having a plurality of depressions in one surface, each said depression substantially conforming to the outer surface of said conductors so that said first and second members are relatively retained in a clamping relationship with a plurality of conductors therebetween so as to retain said conductors in a substantially parallel spaced apart relationship, said first members and one of said U-shaped sections and said generally flat members having cooperatively disposed means supporting said first members in spaced apart relation thereon with said depressions facing outward therefrom and being aligned so as to potentially support each conductor substantially parallel to the length thereof, said first and second members having means clamping said second member to said first member to retain said conductors therebetween, said conductor having an outer wall with a continuous longitudinal slot therein and at least one web which, in cooperation with the unslotted walls of said conductors, defines a longitudinal passageway therethrough.

* * * * *